United States Patent [19]

Zemel et al.

[11] Patent Number: 4,958,015

[45] Date of Patent: Sep. 18, 1990

[54] PREPARATION OF CROSSLINKED CYCLODEXTRIN RESINS WITH ENHANCED POROSITY

[75] Inventors: Haya Zemel; Mark B. Koch, both of Des Plaines, Ill.

[73] Assignee: UOP, Des Plaines, Ill.

[21] Appl. No.: 249,131

[22] Filed: Sep. 30, 1988

[51] Int. Cl.$^5$ ............................................. C08B 37/02
[52] U.S. Cl. .................................... 536/103; 536/106; 536/110; 536/124; 527/300; 527/311
[58] Field of Search ............... 536/103, 124, 106, 110; 527/300, 311

[56] References Cited

U.S. PATENT DOCUMENTS 3,472,835 10/1969 Buckler et al. ...................... 260/209
4,902,788 2/1990 Zemel et al. ......................... 536/103

FOREIGN PATENT DOCUMENTS 2165549A 4/1986 United Kingdom .

OTHER PUBLICATIONS

J. Szejtli, *Starch*, 34, 379–385 (1982).
R. D. Yang and A. E. Humphrey, *Biotech. Bioeng.*, 17, 1211–1235 (1957).

*Primary Examiner*—Ronald W. Griffin
*Attorney, Agent, or Firm*—Thomas K. McBride; Eugene I. Snyder

[57] ABSTRACT

Resins resulting from the crosslinking of cyclodextrin with dicarboxylic acid dihalides often show marginal binding capacity for guest molecules and poor kinetics of guest molecule removal because of the limited porosity of the resins. Resins whose apparent bulk density has been reduced by at least 20% show an enhancement in both of the aforementioned properties resulting from an increase in porosity of the resins. Such resins in general can be formed by conducting the crosslinking reaction in the presence of a blowing agent. The resulting materials retained their desirable physical properties for use in a fixed or packed bed.

25 Claims, 1 Drawing Sheet

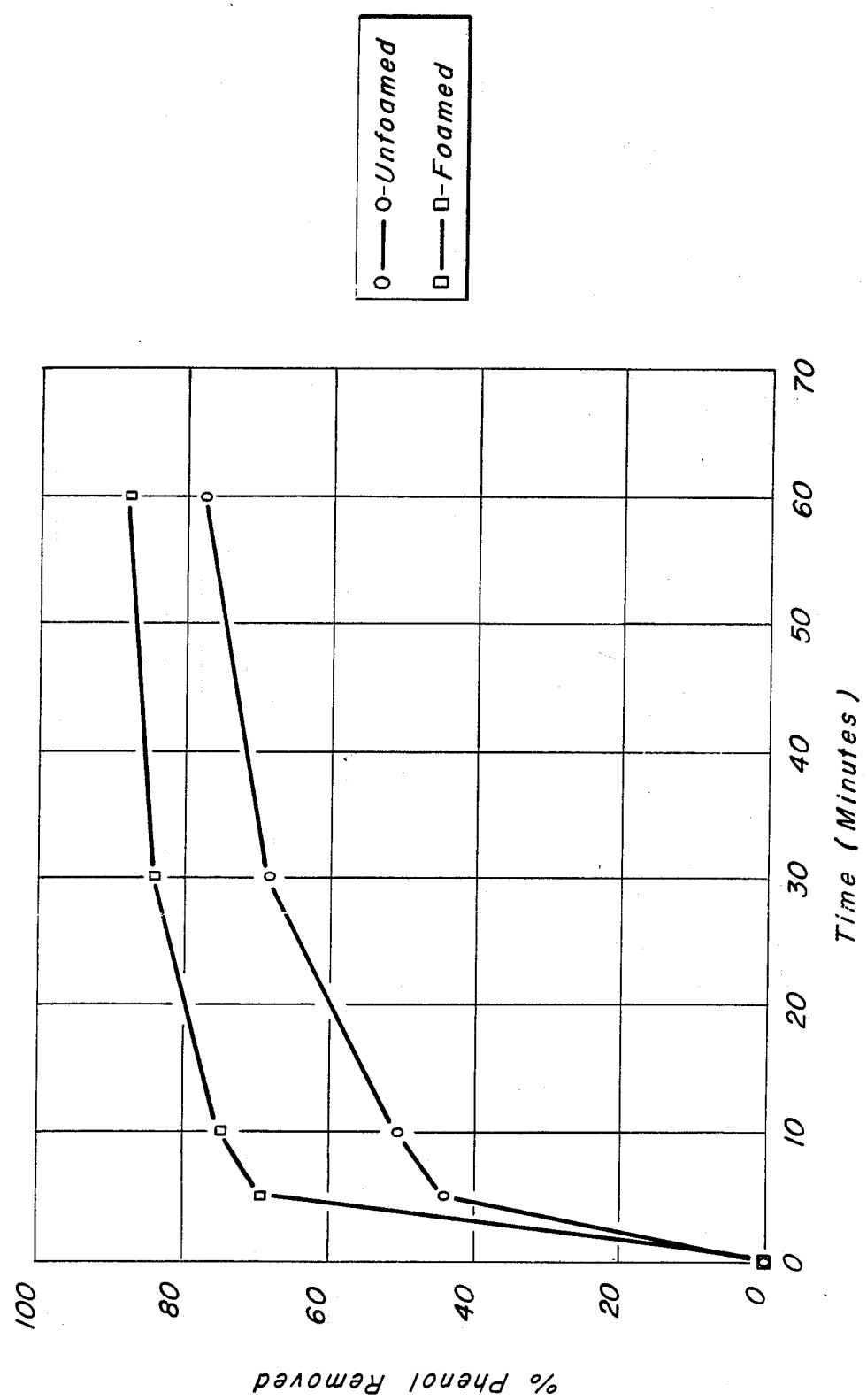

PREPARATION OF CROSSLINKED CYCLODEXTRIN RESINS WITH ENHANCED POROSITY

BACKGROUND OF THE INVENTION

Cyclodextrins are cyclic molecules consisting of 1–4 linked alpha-D-glucopyranose monomeric units. The cyclodextrins containing 6-, 7-, and 8-glucose units joined to form a ring, commonly known as alpha-, beta-, and gamma-cyclodextrin, respectively, are the most important cyclodextrins to date, possibly because of their availability relative to cyclodextrins of different ring size. The usefulness of these cyclodextrins arises from their ability to reversibly form inclusion complexes, or clathrates, with many types of compounds. Inclusion complexes arise when a host molecule, such as a cyclodextrin, has a structure containing an interior cavity into which guest molecules can bind by weak interactions such as van der Waal's forces. The latter are short range forces which are sufficiently strong to allow the formation of definite, generally solid complexes, but are sufficiently weak to permit ready dissociation of the complex to a host and guest molecule under appropriate conditions.

The cyclodextrins are doughnut-shaped molecules with an interior cavity whose size and shape is determined by the number of glucose units that make up the ring. In alpha-cyclodextrin the almost cylindrical cavity is approximately 7 angstroms deep and 5 angstroms in diameter. In beta-cyclodextrin the depth is the same but the diameter is 7 angstroms, and in gamma-cyclodextrin cavity is again 7 angstroms deep but is 9 angstroms in diameter. Cyclodextrins are soluble in water because of the many hydroxyl groups of the glucose subunits that surround the rim of the cavity. However, the interior of the cavities themselves is hydrophobic, and these hydrophobic cavities extract organic molecules from aqueous solution if the organic materials have the correct shape and hydrophobic character.

The complexing ability of cyclodextrins lends itself to various uses. For example, the cyclodextrins are used in encapsulating desirable flavors and fragrances which can then be stored for reasonably long periods of time and added to foods at their preparation. Reciprocally, cyclodextrins may be used in removing undesirable flavors and fragrances from food by complexing with them. Cyclodextrins also are used in the protection of foods against oxidation, photochemical degradation, and thermal decomposition. These and other uses have been summarized by J. Szejtli, *Starch*, 34, 379–385 (1982)

Although in some applications the use of the water soluble cyclodextrins themselves are appropriate, in other cases it is more desirable to employ an insolubilized cyclodextrin to more readily enable its extended use or to enable its incorporation in a continuous process. For example, when cyclodextrins are employed for their ability to separate various components, as in gas phase chromatography or high pressure liquid chromatography, the water soluble cyclodextrins have obvious limitations and some sort of solid phase incorporating cyclodextrins is needed. Another example is the use of cyclodextrins to remove bitter components in citrus juice where it is desired to pass the juice over a solid bed incorporating cyclodextrins to give an effluent of reduced bitterness.

These needs previously have been recognized, and one general solution is the preparation of polymeric cyclodextrin derivatives as resins having properties appropriate for a solid support in chromatographic applications or for use as a fixed bed in continuous processes. Buckler et al. in U.S. 3,472,835 recognized the need for insolubilized cyclodextrins as "molecular sieves" in the separation and purification processes and offered as a general solution insoluble derivatives prepared from the reaction of cyclodextrins with compounds having at least two hydroxyl-reactive functional groups per molecule. The patentee disclosed a large class of suitable polyfunctional compounds, including dicarboxylic acid dihalides, and exemplified several insoluble polymeric cyclodextrin derivatives suitable for use in numerous described applications.

The limited porosity of such prior art resins impedes the diffusivity of guest molecules and seriously curtails the capacity of the resin to bind with typical guest molecules, both of which are marked disadvantages. It was reasoned that if the porosity of the cyclodextrin resins prepared by crosslinking cyclodextrin with dicarboxylic acid dihalides could be increased their binding capacity would show a parallel increase, substantially improving their utility in commercial processes. A cautious course must be steered between Scylla and Charybdis, for on one hand the solid resins are contemplated being used as a fixed or packed bed, which requires good flow characteristics, high incompressibility, crush strength, and abrasion resistance, while increasing porosity generally leads to a more fragile solid. The invention to be described pertains to cyclodextrins crosslinked by dicarboxylic acid dihalides with enhanced porosity. The increase in porosity affords increased binding capacity and improved kinetics of guest molecule inclusion. However, the increased porosity of the resins of this invention is not so great as to give a resin unsuitable for use in fixed or packed beds.

SUMMARY OF THE INVENTION

The purpose of the invention described within is to prepare crosslinked cyclodextrin resins with a porosity greater than that resulting from conventionally prepared crosslinked resins and which retain the physical properties necessary for good performance in a fixed or packed bed. One embodiment is a foamed cyclodextrin crosslinked with a dicarboxylic acid dihalide. In a more specific embodiment the parent of the dicarboxylic acid dihalide is a linear alkane dicarboxylic acid. In a still more specific embodiment the dicarboxylic acid is glutaric or adipic acid. In yet another more specific embodiment the resin is foamed with carbon dioxide generated in situ.

DESCRIPTION OF THE FIGURE

FIG. 1 graphically depicts the rate of removal of phenol by "normal" unfoamed glutaric acid-crosslinked beta-cyclodextrin and its foamed counterpart.

DESCRIPTION OF THE INVENTION

This invention relates to cyclodextrin crosslinked with dicarboxylic acid dihalides to afford polymeric resins with increased porosity and decreased apparent bulk density relative to analogous resins formed by conventional techniques, and with a particle surface area increased by almost an order of magnitude. In another aspect this invention pertains to a method of making such resins with increased porosity by crosslinking the cyclodextrin in the presence of a void forming agent.

The cyclodextrins which are crosslinked in the practice of this invention may be either natural or synthetic cyclodextrins. The natural cyclodextrins include alpha-cyclodextrin, beta-cyclodextrin, and gamma-cyclodextrin. The synthetic cyclodextrins include, for example, branched cyclodextrins such as those illustrated and exemplified in G.B. 2,165,549.

The cyclodextrin to be crosslinked is reacted with a dicarboxylic acid dihalide having as its parent a linear alkane dicarboxylic acid, $HO_2C(CH_2)_nCO_2H$, where n is an integer from 1 through about 8. Examples of such alkane dicarboxylic acids include malonic acid, succinic acid, adipic acid, glutaric acid, pimelic acid, suberic acid, azelaic acid, and sebacic acid, with some preference being expressed for succinic, glutaric and adipic acids. Other acids which may be employed, although not necessarily with equivalent results, include phthalic acids, ring-substituted phthalic acids, and the hexahydro counterparts of phthalic and ring-substituted phthalic acids. By phthalic acids are included phthalic acid, terephthalic acid, and isophthalic acid. The aromatic ring in phthalic acid also may bear inert substituents, such as alkyl groups containing from 1 to 10 carbon atoms, alkoxy groups containing 1 to 10 carbon atoms, halogens, and aryl groups, especially the phenyl group. The chief disadvantage of aromatic dicarboxylic acids is the relatively low yield of resin formed when they are employed.

The dicarboxylic acid dihalide used is usually the chloride, in part because it is most conveniently available. However, acid bromides, fluorides, and to a lesser extent, the iodides may be used although not necessarily with results which are the same in all respects. The molar proportion of the dicarboxylic acid dihalide to cyclodextrin may range from about 1:1 up to about 20:1. Higher ratios may be utilized without any apparent detriment but with no apparent benefit, and the use of lower ratios affords lower yields. The optimum molar ratio of dicarboxylic acid dihalide to cyclodextrins appears to be in the range from about 8:1 to about 12:1 but can readily be determined without undue experimentation.

The reaction between the cyclodextrin and the dicarboxylic acid dihalide is performed homogeneously. The choice of solvent is not critical so long as it is unreactive under the reaction conditions. Dissolution of at least the natural cyclodextrins requires a polar solvent, and dipolar aprotic solvents are particularly useful reaction solvents. Among such solvents are included dimethylformamide, dimethylsulfoxide, N-methylpyrrolidone, hexamethylphosphoramide, and dimethylacetamide. Pyrridine also can be used as a solvent where its basic properties are not a detriment. The reaction mixture is usually on the order of 0.1–0.2 molar in cyclodextrin although this is not a parameter which substantially affects the outcome. Polymerization proceeds rapidly at ambient temperature and often is over within several minutes. However, it will be appreciated that the reaction time is a function, inter alia, of such things as concentration of reactants, reaction temperature, the particular dicarboxylic acid dihalide used, the relative molar proportion of dicarboxylic acid dihalide used, and so forth. The crosslinked polymerized cyclodextrin readily precipitates from solution and previously was used in this form.

The product obtained by the prior art method as described above has an apparent bulk density (ABD) on the order of 0.6–0.7 g/mL. The point of departure from the prior art of the present invention is the use of a void forming agent during crosslinking to give a foamed crosslinked cyclodextrin whose porosity is substantially less than that of the crosslinked product formed in the absence of a void forming agent. In this application the apparent bulk density and particle surface area of the dried resin may be used as the measure of porosity. Our invention affords materials with an apparent bulk reduction of at least 20%, and reductions of 25–40% are not uncommon with a reduction of at least 30% preferred. The materials of our invention also show an increase in particle surface area of at least 8, up to at least 30, relative to that of the prior art product. Blowing agents are one class of void forming agents, and a particularly desirable subclass of blowing agents are in situ gas forming agents. Bicarbonate salts are especially good in the practice of this invention, since the reaction of dicarboxylic acid dihalides with cyclodextrins is accompanied by acid formation. The acid then reacts with bicarbonate to generate carbon dioxide at a rate which is matched by the rate of crosslinking. The carbon dioxide bubbles when formed are small and readily entrapped by the forming gel to ultimately give the foamed product. When bicarbonate salts are used it is necessary that the reaction solvent not be a basic material to avoid neutralization of the acid by an agent other than bicarbonate.

When bicarbonate salts are used they will be employed in a molar ratio, relative to the cyclodextrin, of at least 0.3:1 and up to about 10:1. More frequently the minimum amount is a molar ratio of about 1:1, and it is observed that the product characteristics are rather insensitive to ratios greater than about 2:1. Among the bicarbonate salts sodium bicarbonate is best because of its widespread availability and convenience. However, the nature of the bicarbonate is not important. Thus, other bicarbonates that can be used are the alkali and alkaline earth metal bicarbonates generally, such as potassium bicarbonate, magnesium bicarbonate, lithium bicarbonate, calcium bicarbonate, and so forth. Since the bicarbonates generally are not soluble in the solvent which is the reaction medium the bicarbonate should be of suitably small size and well dispersed throughout the reaction medium by good stirring. In most cases the sodium bicarbonate powder as commercially supplied is of sufficiently small size to be used directly.

Another class of in situ gas formers which may be used in the practice of this invention are materials whose volatility is sufficiently high that the exothermicity of the reaction causes them to boil. Among these are various halogenated hydrocarbons generally, especially fluorine-containing hydrocarbons. Representative of the latter are fluorotrichloromethane, 1,1,2-trichlorotrifluoroethane, 1,2-dichlorotetrafluoroethane, and dichlorodifluoromethane. Other materials which have been used as blowing agents include the pentanes, hexanes, azodicarbonamide, 4,4′-oxy-bis(benzenesulfonylhydrazide), 2,2-azobisisobutyronitrile, and dinitrosopentamethylenetetramine. Normally such blowing agents are used at a concentration between about 0.5 and about 5 weight percent relative to the solid resin produced.

Yet another method of foaming involves forming the gel in the presence of gas introduced from an external source. Thus, a gas such as nitrogen, carbon dioxide, air, and so forth can be blown into the reaction mixture during the course of the reaction. As the forming resin gels it entraps gas bubbles and a foamed structure results. However, it has been observed that the cell size within the foams is more irregular and somewhat larger than that using in situ gas generation, and the use of an external gas source is less favored.

The examples which follow are only illustrative of this invention and are not intended to limit it in any way thereby. In particular, we emphasize that beta-cyclodextrin is used only in a representative capacity.

EXAMPLE I

Preparation of Crosslinked Cyclodextrin Resins

The polymerization was carried out in a dry, nitrogen-purged glove bag with all reactants having been dried. Beta-cyclodextrin was dried at 100°C. for 1 hour, and dimethylformamide was maintained dry by storage over Linde 4A molecular sieve. Reaction was effected by adding the dicarboxylic acid dichloride to a solution of cyclodextrin dissolved in dimethylformamide while the mixture was magnetically stirred. Polymerization occurred either immediately or within a couple of minutes after the addition of dihalide. The reaction was quite exothermic with gelling usually interfering with the stirring process. To the cooled reaction mixture was added water to hydrolyze any unreacted acid chloride as well as to dissolve any unreacted cyclodextrin. This may take as little as 5 minutes or as long as 20 hours, depending on the type of polymer. The glutaryl and adipoyl based polymers were rinsed overnight since they formed a hard shell using 1 liter of water per 200 mL of polymer. Water was removed and organic solvents were used to remove the dimethylformamide trapped inside the polymer. The polymer was soaked in an equal amount of acetone for 1-2 hours with 1 change, the acetone was replaced with ethanol, and the polymer soaked again with one change. The ethanol was replaced with water, causing the polymeric particles to float in the water. When most particles had sunk, indicating displacement of ethanol by water, the water was changed and soaking was continued for approximately 1 hour, followed by filtration and oven drying at under 100° C. The resulting polymer was ground and sieved. The following is a more detailed description of the preparation of cyclodextrin crosslinked with glutaryl dichloride and is intended to be representative of the procedure followed throughout.

In a nitrogen purged glove bag, 100 g of beta-cyclodextrin (oven dried 1 hour at 100° C.) was dissolved in 600 mL of DMF (dried over Linde 4A molecular sieve). Glutaryl chloride (0.881 moles, 113 mL) was added to the stirred solution and stirring was increased as the solution thickened. In 10 minutes polymerization occurred, stopping the stirrer. The resinous mass was allowed to cool for 15 minutes and acetone (1200 mL) was then added over the top of the resin. The resin was cut with a spatula into large sections and allowed to soak in the acetone for 16 hours. The acetone was poured off, and the resin was transferred to a 2 liter beaker and washed with 1200 mL of water four times with 30 minutes soaking between washes. The resin was then soaked in 1200 mL of absolute ethanol for two hours. The ethanol was poured off and the resin soaked in 1200 mL of water until it sank to the bottom of the beaker. The water was poured off and the resin soaked again in 1200 mL of absolute ethanol for 2 hours. The ethanol was poured off and the resin dried at 110° C. The resin was then ground to the desired mesh. Yield was 140 g of resin.

EXAMPLE II

Foamed Crosslinked Resins Using Bicarbonate as an in situ Gas Former

As a general method, a mixture of bicarbonate and a solution of cyclodextrin in DMF was mixed well until a homogeneous slurry was obtained. The solvent, dimethylformamide, the cyclodextrin, and the bicarbonate were previously dried. To this solution the dicarboxylic acid dihalide was added. Crosslinking occurred and foaming of the solution was observed at that time. After the foaming subsided and the solution gelled, the resulting resin was washed with acetone, with water and with ethanol as described above. A particular preparation is described below.

In a nitrogen purged glove bag, 100 g of beta-cyclodextrin (oven dried 1 hour at 100° C.) was dissolved in 600 mL of DMF dried over Linde 4A molecular sieve. To the CD solution 18.5 g of sodium bicarbonate (dried 1 hour at 110° C.) were added and the mixture was stirred to effect a homogeneous slurry. Glutaryl chloride (0.881 moles, 113 mL) was added to the stirred solution and stirring was increased as the solution thickened and foamed. In 10 minutes polymerization occurred, stopping the stirrer, with the volume increasing two and one half times. The resinous mixture was allowed to cool, as heat is generated during polymerization, for 15 minutes. Acetone (1200 mL) was then added over the top of the resin. The resin was cut with a spatula into large sections and allowed to soak in the acetone for 16 hours. The acetone was poured off, and the resin was transferred to a 2 liter beaker and washed with 1200 mL of water four times with 30 minutes soaking between washes. The resin was then soaked in 1200 mL of absolute ethanol for two hours. The ethanol was poured off and the resin soaked in 1200 mL of water until it sank to the bottom of the beaker. The water was poured off and the resin soaked again in 1200 mL of absolute ethanol for 2 hours. The ethanol was poured off and the resin dried at 110° C. The resin was then ground to the desired mesh. Yield was 130 g of resin.

EXAMPLE III

Variation in Crosslinked Resin Yield

Crosslinked resins were prepared as described above by varying the ratio of beta-cyclodextrin to the crosslinking agent. Results are shown in Table 1, where percent resin yield is the weight of resin relative to weight of cyclodextrin used, expressed as a percentage.

TABLE 1

| Effect of Concentrations on Beta-cyclodextrin Resin Yields | | |
|---|---|---|
| Crosslinking Agent | BCD:Agent | % Resin Yield |
| Succinyl | 1:2 | 0 |
| | 1:4 | 12 |
| | 1:4 | 12 |
| | 1:4 | 10 |
| | 1:8 | 110 |
| | 1:8 | 136 |
| Glutaryl | 1:2 | 0 |
| | 1:4 | <10 |
| | 1:8 | 112 |
| | 1:16 | 120 |
| Adipoyl | 1:2 | 0 |
| | 1:4 | <10 |

TABLE 1-continued

Effect of Concentrations on Beta-cyclodextrin Resin Yields

| Crosslinking Agent | BCD:Agent | % Resin Yield |
|---|---|---|
| | 1:8 | 170 |
| | 1:10 | 132 |

From these results it appears that the optimum ratio of dicarboxylic acid dihalides to cyclodextrin is from about 8:1 to about 12:1.

EXAMPLE IV

Resin Performance

The performance of the various resins was evaluated by comparing their phenol extraction capability by two different procedures. The first test was performed by adding 0.1 g of polymer to 2 mL of an aqueous solution containing 200 ppm phenol. After 2 hours, 0.1 mL of the filtered solution was analyzed for unbound phenol via the assay of R. D. Yang and A. E. Humphrey, Biotech. Bioeng., 17, 1211–1235 (1957). The phenol uptake of the resin at the 200 ppm level was expressed as the percent phenol removed from solution. The second test was the determination of the Langmuir isotherm. In this determination 4 to 7 concentrations of phenol ranging from 200–20,000 ppm were tested against 0.1 g samples of polymer in a procedure analogous to the foregoing one except that the samples may be mixed for two hours or allowed to remain overnight. From an isotherm the theoretical capacity and the binding constant were determined. The capacity is given below as the weight of phenol, in milligrams, taken up by 1 g of resin. A preparation of crosslinked thinned starch (glutaryl-maltrin or adipoyl-maltrin) was run for comparison.

TABLE 2

Equilibrium Phenol Capacity of Di-Acyl-Chlorides-Linked Beta-cyclodextrin and Maltrin

| Resin | n(CH$_2$) (Crosslinker) | Consistency | % Phenol Removal at 200 ppm Level | Langmuir Capacity mg/g |
|---|---|---|---|---|
| Malonyl-BCD | 1 | Powder | 57 | — |
| Succinyl-BCD | 2 | " | 87 | 141 |
| Succinyl-Maltrin | 2 | " | 20 | 48 |
| Glutaryl-BCD | 3 | Glassy Gel | 77 | 156 |
| Glutaryl-Maltrin | 3 | " | 34 | 909 |
| Adipoyl-BCD | 4 | " | 69 | 159 |
| Adipoyl-Maltrin | 4 | " | 37 | 287 |
| Sebacoyl-BCD | 8 | " | 33 | — |

EXAMPLE V

Mixed Succinyl-Adipoyl Resins

A series of resins prepared from a mixture of succinyl and adipoyl chlorides in different molar ratios was prepared to determine their effect on resin performance. The results are summarized in Table 3.

TABLE 3

Phenol Capacity of Beta-cyclodextrin Succinyl-Adipoyl Resins

| Succinyl/ Adipoyl Ratio | % Phenol Removal at 200 PPM Level | Langmuir Capacity mg/g |
|---|---|---|
| 1:4 | 72 | 597 |
| 1:2 | 74 | 158 |
| 1:1 | 78 | 133 |
| 2:1 | 76 | 131 |
| 4:1 | 76 | 98 |

EXAMPLE VI

Porosity Enhanced Crosslinked Resins

Porosity enhanced resins were prepared by using sodium bicarbonate as an in situ gas former during preparation of the resin as previously described. Performance characteristics, especially relative to non-foamed resins, are summarized in Table 4 and physical characteristics are summarized in Table 5.

TABLE 4

Porosity Enhanced Crosslinked Beta-cyclodextrin

| Cross-linker | Porosity Enhancer | ABD g/mL | % Phenol Removal at 200 ppm Level | Langmuir Capacity mg/g |
|---|---|---|---|---|
| glutaryl dichloride | None | 0.71 | 77 | 156 |
| glutaryl dichloride | NaHCO$_3$ | 0.44 | 86 | 172 |
| adipoyl dichloride | None | 0.59 | 69 | |
| adipoyl dichloride | NaHCO$_3$ | 0.45 | 81 | |

TABLE 5

Crosslinked Resins - Physical Properties

| Resin | Bead Size | Moisture Content (%) | Bulk Density (gm/ml) | Surface Area (m$^2$/g) | Dry Volume (ml/gm) | Water Adsorption (gmH$_2$O/gm) | Hydrated Volume (ml/gm) |
|---|---|---|---|---|---|---|---|
| Succinyl | 25–60 | 7.29 | 0.216 | | 4.63 | 0.77 | 5.4 |
| Adipoyl | 25–60 | — | 0.591 | 0.082 | 1.69 | 0.21 | 1.9 |
| Adip-NaHCO$_3$ | 25–60 | | 0.45 | | | | |
| Glutaryl | 25–60 | 2.71 | 0.710 | 0.056, 0.025 | 1.40 | 0.45 | 1.85 |
| Glut-HCO$_3$ | 25–60 | 1.89 | 0.44 | 0.77, 0.43 | 2.25 | 0.8 | 3.05 |
| Glutaryl | 40–60 | 5.06 | 0.524 | | 1.91 | 1.0 | 2.9 |

EXAMPLE VII

Rate of Phenol Removal

The ability of a resin to remove phenol from aqueous solution was determined as described in Example IV, but instead of one sample being analyzed after two hours samples were analyzed periodically. Results are depicted in FIG. 1, which shows that the kinetics of phenol removal by the foamed resin are much faster than those of the untreated resins.

EXAMPLE VIII

Preparation of Crosslinked Alpha-cyclodextrin Resins

The preparation of these materials is generally described by the procedure of Example I. In particular, a solution of 1.25 g alpha-cyclodextrin in 5 mL of dimethylformamide was reacted with 2.16 g (12.8 millimoles) glutaryl chloride at 25° C. for 60 minutes. The resulting resin was isolated by a procedure analogous to that in Example I with the wash solutions being 120 mL. A total of 1.6 g of resin was recovered. Phenol removal (see Example IV) was 54%, which is lower than that of the corresponding glutaryl acid dichloride-crosslinked beta-cyclodextrin resin (77%).

EXAMPLE IX

Removal of Limonin by Crosslinked Resins

Because of the interest in removing limonin from citrus juice both the capacity and kinetics of limonin removal from aqueous solution was determinned for several of the crosslinked resins. Limonin determination was by an enzyme immunoassay according to U.S. 4,305,923 using a BITTERDETEK ™ LIMONIN TEST KIT from Idetek, Inc.

Initial Screening

Several different types of crosslinked cyclodextrin resins were screened for relative effectiveness of limonin removal. The procedure was to add to the indicated amount of crosslinked resins 0.1 mL of an aqueous limonin solution, used as a standard, having 16 ppm limonin. After 24 hours at ambient temperature the sample was centrifuged and the supernatant analyzed for limonin with results summarized in Table 6. The results fail to differentiate the various crosslinked beta-cyclodextrins as regards their performance characteristics.

TABLE 6

Screening of Limonin Removal by Crosslinked Beta-cyclodextrin

| Resin Type | Resin Amount (mg) | Limonin Remaining |
|---|---|---|
| glutaryl | 5 | 1.9 ppm |
| " | 10 | 0 |
| " | 20 | 0 |
| " | 40 | 0 |
| adipoyl | 10 | 1.9 ppm |
| " | 20 | 0 |
| " | 40 | 0 |
| succinyl | 10 | 0 |
| " | 20 | 0 |
| " | 40 | 0 |

Capacity of Glutaryl-Crosslinked Beta-Cyclodextrin Resins for Limonin

To 5 mg of a glutaric acid dichloride crosslinked beta-cyclodextrin resin was added 0.1 mL of the standard solution containing 16 ppm limonin. After 1.5 hours the sample was centrifuged and supernatant was removed and stored at 0° C. To the solid was added a second 0.1 mL of limonin standard, which was shaken, centrifuged, and the supernatant saved again. This procedure was repeated until a total of 5 aliquots of the limonin standard were added, with the last aliquot being reacted for 17 hours at ambient temperature. Table 7 summarizes these results.

TABLE 7

| Aliquot No. | Capacity for limonin Removal Limonin Remaining (ppm) |
|---|---|
| 1 | 2.1 |
| 2 | 4.8 |
| 3 | 4.5 |
| 4 | 3.6 |
| 5 | 4.0 |

Kinetics of Limonin Removal

To 5 milligram samples of glutaryl-crosslinked beta-cyclodextrin were added 0.1 mL of the 16 ppm limonin standard. At various times the samples were centrifuged and the supernatant removed for analysis. The results, which appear in the following table, indicate that limonin uptake is complete at a time between 1 and 2 hours.

TABLE 8

| Time (hrs) | Kinetics of Limonin Uptake Limonin Remaining (ppm) |
|---|---|
| 0.5 | 10.5 |
| 1.0 | 7.0 |
| 2 | 4.6 |
| 4 | 4.0 |
| 6 | 4.7 |

What is claimed is:

1. A method of making a crosslinked cyclodextrin of enhanced porosity comprising reacting a solution of the cyclodextrin with from about 1 to about 20 molar proportions of a dicarboxylic acid dihalide in the presence of a blowing agent to form a solid crosslinked resin having a reduction in apparent bulk density of at least 20% relative to the crosslinked resin prepared in the absence of the blowing agent.

2. The method of claim 1 where the cyclodextrin is alpha-cyclodextrin, beta-cyclodextrin, or gamma-cyclodextrin.

3. The method of claim 2 where the cyclodextrin is beta-cyclodextrin.

4. The method of claim 1 where the dicarboxylic acid dihalide has as its parent a dicarboxylic acid selected from the group consisting of $HO_2C(CH_2)_nCO_2H$, where n is an integer from 1 to about 8, phthalic acids, ring-substituted phthalic acids, hexahydrophthalic acids, and any combination thereof.

5. The method of claim 4 where the parent acid is selected from the group consisting of malonic, succinic, glutaric, adipic, pimelic, subaric, azelaic, and sebacic acids, or any combination thereof.

6. The method of claim 5 where the parent acid is succinic acid.

7. The method of claim 5 where the parent acid is glutaric acid.

8. The method of claim 5 where the parent acid is adipic acid.

9. The method of claim 5 where the parent acid is a mixture of succinic and glutaric acids.

10. The method of claim 1 where the foaming agent is an in situ gas former.

11. The method of claim 10 where the in situ gas former is selected from the group consisting of bicarbonate salts and halogenated hydrocarbons.

12. The method of claim 1 where the reduction in apparent bulk density is at least about 30%.

13. The method of claim 1 where the molar proportions of dicarboxylic acid dihalide to cyclodextrin is between about 8:1 to about 12:1.

14. A crosslinked cyclodextrin foamed resin comprising a cyclodextrin crosslinked with from about 1 to about 20 molar proportions of a dicarboxylic acid dihalide, said resin having a reduction in apparent bulk density of a least about 20% relative to the unfoamed resin.

15. The resin of claim 14 where the cyclodextrin is alpha-cyclodextrin, beta-cyclodextrin, or gamma-cyclodextrin.

16. The resin of claim 15 where the cyclodextrin is beta-cyclodextrin.

17. The resin of claim 14 where the dicarboxylic acid dihalide has as its parent a dicarboxylic acid selected from the group consisting of $HO_2C(CH_2)_nCO_2H$, where n is an integer from 1 to about 8, phthalic acids, ring-substituted phthalic acids, hexahydrophthalic acids, or any combination thereof.

18. The resin of claim 17 where the parent acid is selected from the group consisting of malonic, succinic, glutaric, adipic, pimelic, subaric, azelaic, and sebacic acids, or any combination thereof.

19. The resin of claim 18 where the parent acid is succinic acid.

20. The method of claim 18 where the parent acid is glutaric acid.

21. The method of claim 18 where the parent acid is adipic acid.

22. The resin of claim 18 where the parent acid is a mixture of succinic and glutaric acids.

23. The resin of claim 14 where the reduction in apparent bulk density is at least about 30%.

24. The resin of claim 14 where the molar proportions of dicarboxylic acid dihalide to cyclodextrin is between about 8:1 to about 12:1.

25. The resin of claim 14 further characterized in having at least an eight-fold increase in particle surface density relative to unfoamed resin.

* * * * *